United States Patent [19]
Schmidt

[11] 3,976,423
[45] Aug. 24, 1976

[54] COOLED FURNACE TRANSPORT ROLLER

[75] Inventor: Theodor Schmidt, Heiligenhaus-Isenbugel, Germany

[73] Assignee: Ludwig-Ofag-Indugas Industrieofenanlagen GmbH, Germany

[22] Filed: Mar. 17, 1975

[21] Appl. No.: 558,651

[30] Foreign Application Priority Data
Mar. 20, 1974 Germany............................ 2413270

[52] U.S. Cl.................................. 432/236; 34/240; 432/246
[51] Int. Cl.²............................................ F27D 3/00
[58] Field of Search ........... 432/233, 235, 236, 246; 34/240

[56] References Cited
UNITED STATES PATENTS

| | | | |
|---|---|---|---|
| 2,468,892 | 5/1949 | O'Keeffe............................... | 34/240 |
| 2,950,097 | 8/1960 | Tohir..................................... | 432/246 |
| 3,100,631 | 8/1963 | Schmidt................................ | 432/246 |
| 3,115,335 | 12/1963 | Ornitz et al........................... | 432/236 |

FOREIGN PATENTS OR APPLICATIONS

| | | | |
|---|---|---|---|
| 748,157 | 10/1944 | Germany ............................. | 432/246 |

*Primary Examiner*—John J. Camby
*Attorney, Agent, or Firm*—McGlew and Tuttle

[57] ABSTRACT

A cooled furnace transport roller comprises a hollow cylindrical roller having an intermediate furnace space portion which is adapted to be positioned in a furnace and with a stub shaft portion adjacent each end which is supported on bearing means located exteriorly of the furnace. A hollow interior tube is located on the interior of the cylindrical roller and is spaced inwardly therefrom and it defines a space between its exterior and the interior of the hollow cylindrical roller for the flow of a coolant gas which is returned through openings of the hollow interior tube and through the interior thereof. A tubular wire net cooling insert is located in the space between the hollow interior tube and the cylindrical roller interior and it is formed with a wire mesh having good heat resistance and good heat conductivity. The mesh is advantageously of wave shaped configurations with the wave formations being disposed with their peaks in touching engagement with the interior of the cylindrical roller and the hollow interior tube and with the waves having a sloping side face so that the faces of the mesh exposed to the gas flow define a substantially closed pattern.

6 Claims, 3 Drawing Figures

COOLED FURNACE TRANSPORT ROLLER

BACKGROUND OF THE INVENTION

1. Field of the Invention

This invention relates in general to the construction of transport rollers and in particular to a new and useful transport rollers adapted to be used in a furnace space and which has an interior hollow tube defining a coolant flow space between the hollow tube and the cylindrical roller interior with a cooling insert disposed in the space made of a highly conductive tubular mesh of wave shape form disposed between the hollow tube and the interior of the cylindrical roller.

2. Description of the Prior Art

The known furnace transport rollers have a free space between the outer cylindrical roller body and an inner body having no structural elements therein. High furnace temperatures however lead to difficulties in operation with such devices under certain conditions because of the failure to have sufficient cooling of the outer cylindrical roller. Where the cooling is not satisfactory it is necessary to employ extremely expensive materials even ceramic materials as the construction for the roller body. Up to the present time such drawbacks have been tolerated. Actually the transfer of heat between the roller body and the coolant which is circulated within the roller body is effected through convection and radiation. An application of the prevailing teaching in the heat transfer considerations as mentioned by Schack in "Industrielle Warmegang" Dusseldorf, 1962, pages 60 to 254 leads to a somewhat favorable design of a cooled furnace transport roller but the basic conditions of this construction cannot be changed.

SUMMARY OF THE INVENTION

In accordance with the invention there is provided a furnace transport roller in which the cooling of the roller body is improved. In accordance with the invention a cooling insert comprises one or more wire nettings or a continuous wave shape tubular wire netting which is disposed between an inner hollow tubular member and the interior wall of the hollow cylindrical roller at least in the zone of the roller which is in the furnace space. This insert which is made of a highly conductive wire mesh or grid pattern provides an additional structural part which is provided for the heat transfer through convection or radiation. This structural part also furnishes a further influential parameter for the transmission of the heat which is available for the purposes of design. By this provision the invention makes use of a surprising effect that with otherwise equal constructional and operational parameters of a cooled furnace transport roller, a wire netting or nettings or the like inserted in the interspace between the roller body and the inner body act as cooling elements for the roller body so that a considerable improvement of the roller body cooling is obtained and this may amount to up to 75%.

It has been found that a cooling insert in the form of a wire netting which is placed in the coolant flow path defined between a hollow interior tube and the interior of the cylindrical roller substantially takes the temperature of the coolant. With this temperature it enters into a radiative interaction with the roller body and at the same time a convective heat transfer between the roller body and the coolant is also improved because the wire netting superimposes a microscopic, more or less isotropic, turbulence to the coolant flow. This is substantially a homogeneous flow in the interspace between the roller body and the inner tubular body and favorably influences the transmission of heat through convection. As a result in the inventive furnace transport roller the cooling of the roller body is improved even though the coolant volume and the entrance temperature of the coolant have not been changed. The cooling insert advantageously comprises a wire netting structure such as a sieve formation or a metal mesh formation.

Within the scope of the invention many possibilities of design are provided. In general a undulate configuration or wave shape configuration of the cooling insert in respect to the flow direction of the coolant is provided. Since the interspace between the roller body and the inner body is an annular space the design advantageously includes an insert of waveshape configuration and cylindrical form in an accordion-like formation or in a bellows-like formation. A heat conducting connection between the roller body and the cooling insert is not absolutely necessary even though it may be provided by the touching contact of the insert with both the interior wall of the roller and the exterior wall of the inner tubular member.

In a preferred embodiment of the invention with which optimum conditions can be easily obtained, the cooling insert is made of wires having a diameter of approximately from 0.5 to 3 mm and preferably of from 1 to 2 mm and it comprises a woven or knitted structure having interlacings which are usual in the weaving and knitting technology. The wires themselves are advantageously made of an austenitic material which is resistant to corrosion in the coolant. In addition for a given furnace transport roller designed in accordance with the invention, the optimum structural conditions of the cooling insert can be found relatively easily by testing. In such a case it is advisable always to provide a structure such that the majority of wires forming the cooling insert extend transversely to the flow direction of the coolant and preferably so that in a view taken perpendicularly to the axis of the furnace transport roller these wires appear as an uninterrupted surface and the meshes of the netting disappear.

Accordingly it is an object of the invention to provide a cooled furnace transport roller which comprises a hollow cylindrical roller having an intermediate furnace space portion and a stub shaft portion adjacent each end and having a hollow interior tube within said cylindrical roller spaced inwardly from the interior thereof and extending from the stub shaft portion through the furnace space portion and defining a gas coolant supply flow path from said stub shaft portion to the furnace space portion and a coolant gas return flow path on its interior and which also includes a cooling insert of a heat conductive metal disposed between said cylindrical roller and said hollow interior tube at least in the furnace space portion.

A further object of the invention is to provide a cooled furnace transport roller which provides an insert therein in a coolant path defined between a hollow interior tube on the interior of the roller and its interior wall which is in the form of a tubular wave shaped wire mesh.

A further object of the invention is to provide a cooled furnace transport roller which is simple in design, rugged in construction and economical to manufacture.

For an understanding of the principles of the invention, reference is made to the following description of a typical embodiment thereof as illustrated in the accompanying drawings.

GENERAL DESCRIPTION OF THE PREFERRED EMBODIMENT

Figure 1:
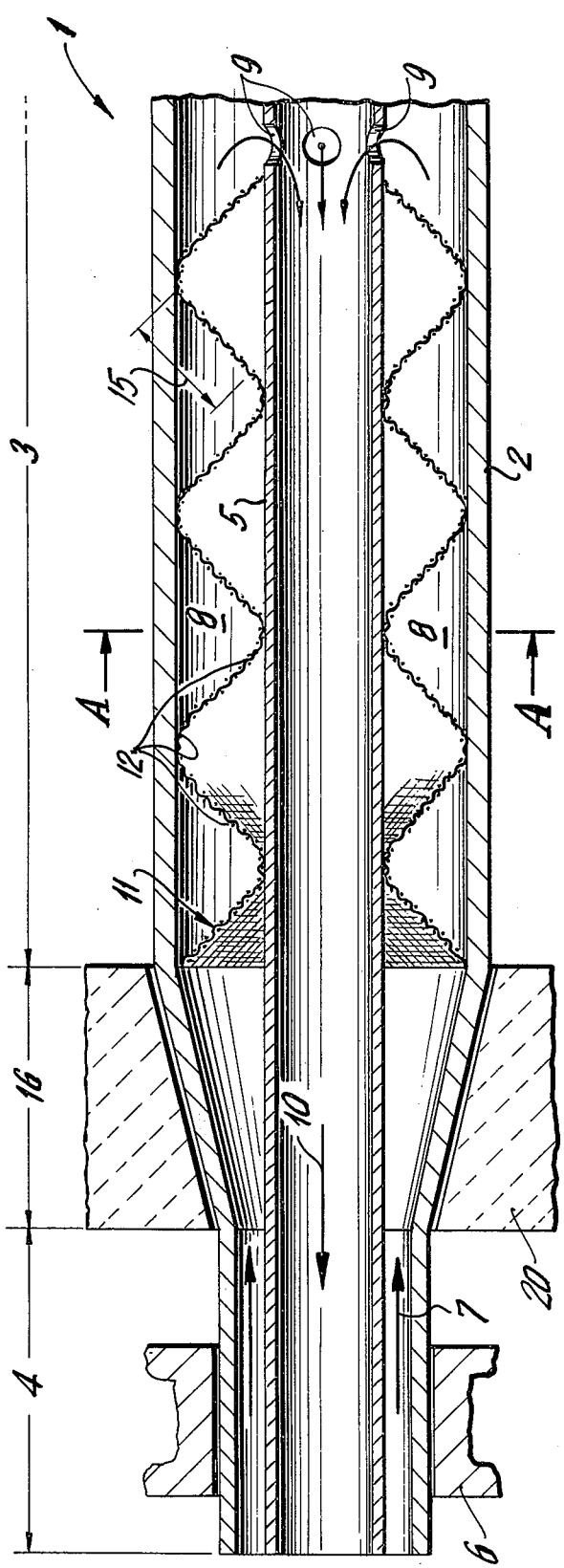
FIG. 1 is a partial axial sectional view of a cooled furnace transport roller constructed in accordance with the invention.
Figure 2:
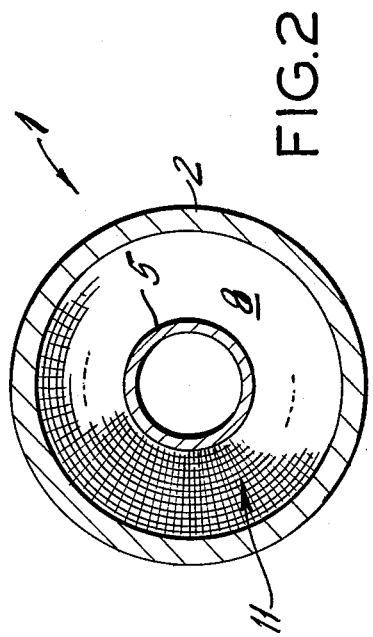
FIG. 2 is a section taken along the line A—A of FIG. 1.

Referring to the drawings in particular the invention embodied therein comprises a cooled furnace transport roller generally designated 1 which comprises a hollow roller body 2 which has an intermediate portion or furnace space portion 3 which extends between the furnace walls 20, 20, only one of which is indicated in the drawings.

In accordance with the invention the hollow cylindrical transport roller 1 includes a stub shaft portions 4, at each end (only one end being shown) which are rotatably supported in bearings 6 which extend on the exterior of the furnace. A hollow tubular member or interior body 5 is located at the interior of the hollow cylindrical roller 2 and it extends throughout a stub shaft portion 4 at each end and an intermediate space portion 3 as well as through a conical transition piece 16 which is located within the furnace wall 20. The roller 1 may of course be constructed of uniform diameter throughout and with or without a transition piece 16.

A gaseous coolant such as air is directed in the direction of arrow 7 in the space defined between the hollow inner body 5 and the cylindrical hollow roller 2 and the interior of the hollow inner body 5 defines a return flow space in the direction of the arrow 10. A communication is provided between the annular space 8 between the hollow inner body 5 and the cylindrical roller 2 and the interior of the hollow inner body 5 through passage openings 9 for example.

In accordance with a feature of the invention a cooling insert generally designated 11 is disposed between the exterior wall of the hollow inner body 5 and the interior wall of the cylindrical roller 2 at least in the furnace space 3. In the preferred arrangement the insert comprises a tubular wire mesh or netting made up of interwoven wires 13 and 14 and it is made in an undulating or wave shaped configuration such that the peaks and valleys of the wave shaped configuration alternately engage with the walls of the hollow roller body 2 and the hollow inner body 5. The insert 11 may have the configuration of an accordion bellows and it should substantially fill up the interspace 8 with its undulations 12 arranged in the manner shown.

Figure 3:
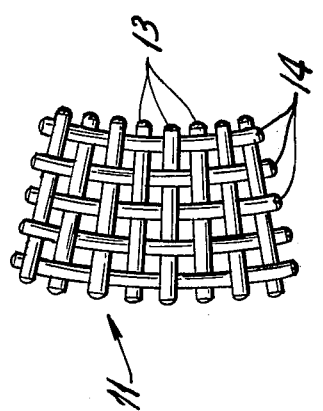
FIG. 3 is a plan view of a portion of the cooling insert in the device shown in FIG. 1.

The insert 11 made of wires 13 and 14 as shown in FIG. 3 advantageously have wires of a diameter from 0.5 to 3 mm and preferably in the range of from 1 to 2 mm. The wires in the embodiment shown are interlaced in the manner of a weave and they are made of austenitic steel sufficiently resistant to corrosion and to heat. The netting is made and arranged so that most of the wires 13 and 14 extend transversely to the flow direction of the coolant. The wire mesh construction contributes to the purpose of the invention and provides a particularly intense cooling of the hollow roller body 2. With the indicated diameter of the wires 13 and 14 the dimensions of the meshes are in the range of 2 to 3 mm. The undulations 12 are steep so that in a zone such as a zone 15 shown in FIG. 1 which is taken perpendicularly to the direction of flow of the coolant the wires which extend transversely to the flow direction appear substantially as an uninterrupted surface while the openings between the wires are not visible.

The invention may be applied to a furnace transport roller having a furnace space portion 3 of the roller body 2 connected to stub shaft portions 4 directly as well as to rollers where a conical transition piece 16 is provided between the furnace space portion 3 and the stub shaft portions 4. In the embodiment shown the insert 11 extends only to the ends of the intermediate furnace space zone 3 but it may of course extend into the transition zone and stub shaft portion zones.

While a specific embodiment of the invention has been shown and described in detail to illustrate the application of the principles of the invention, it will be understood that the invention may be embodied otherwise without departing from such principles.

What is claimed is:

1. A cooled furnace transport roller comprising a hollow cylindrical roller having an intermediate furnace space portion adapted to be positioned in the furnace and a stub shaft portion adjacent each end adapted to extend out of the furnace, a hollow interior tube located within said cylindrical roller and spaced inwardly from the interior thereof and extending from said tube shaft portion through said furnace space portion and defining a gas coolant supply flow path from said stub shaft portion to said furnace space portion between its exterior and the interior of said cylindrical roller and also defining a coolant gas return flow passage on its interior which communicates with said gas coolant supply flow path, and a cooling insert of a heat conductive metal disposed between said cylinder roller and said hollow interior tube at least in said furnace space portion, said cooling insert comprising a cylindrical tubular mesh of wave-shaped configuration.

2. A cooled furnace transport roller according to claim 1, wherein said insert is made of longitudinally and transversely extending interwoven wires having a diameter of approximately from 0.5 to 3 mm and preferably of from 1 to 2 mm.

3. A cooled furnace transport roller according to claim 2, wherein said wires extend transversely to the flow direction of the coolant.

4. A cooled furnace transport roller construction according to claim 3, wherein said wires are made of austenitic steel resistant to corrosion of the coolant.

5. A cooled furnace according to claim 1, including bearing means exteriorly of the furnace rotatably supporting said cylindrical roller at said stub shaft portions, an intermediate transition portion extending between said stub shaft portions and said intermediate furnace space portion, said insert being located only within said furnace space portion of said cylindrical roller.

6. A cooled furnace transport roller according to claim 5, including a furnace wall at each end of said furnace space portion of said cylindrical roller, said cylindrical roller having a transition portion between said stub shaft portions and said intermediate furnace space portion located within the wall of said furnace.

* * * * *